United States Patent
Sano et al.

(10) Patent No.: US 8,419,846 B2
(45) Date of Patent: Apr. 16, 2013

(54) ERASABLE INKJET INK

(75) Inventors: Kenji Sano, Tokyo (JP); Yumiko Sekiguchi, Kawasaki (JP); Satoshi Takayama, Kawasaki (JP); Takeshi Gotanda, Yokohama (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 18 days.

(21) Appl. No.: 13/223,717

(22) Filed: Sep. 1, 2011

(65) Prior Publication Data

US 2012/0266778 A1    Oct. 25, 2012

(30) Foreign Application Priority Data

Apr. 21, 2011    (JP) .................. 2011-095308

(51) Int. Cl.
*C09D 11/02* (2006.01)

(52) U.S. Cl.
USPC .................. 106/31.16; 106/31.23; 106/31.32

(58) Field of Classification Search ............... 106/31.16, 106/31.23, 31.32
See application file for complete search history.

(56) References Cited

FOREIGN PATENT DOCUMENTS

| JP | 2010-222461 | 10/2010 |
| WO | 2011036709 | 3/2011 |

OTHER PUBLICATIONS

European Search Report for European Application No. 11179162.0 mailed on Nov. 2, 2012.

*Primary Examiner* — Kaj K Olsen
*Assistant Examiner* — Veronica F Faison
(74) *Attorney, Agent, or Firm* — Turocy & Watson, LLP

(57) ABSTRACT

According to one embodiment, an erasable inkjet ink includes a leuco dye, a non-water-soluble developer, and a solvent containing an alcohol and water. The amount of the water is 7 to 25% by mass of the solvent.

17 Claims, 2 Drawing Sheets

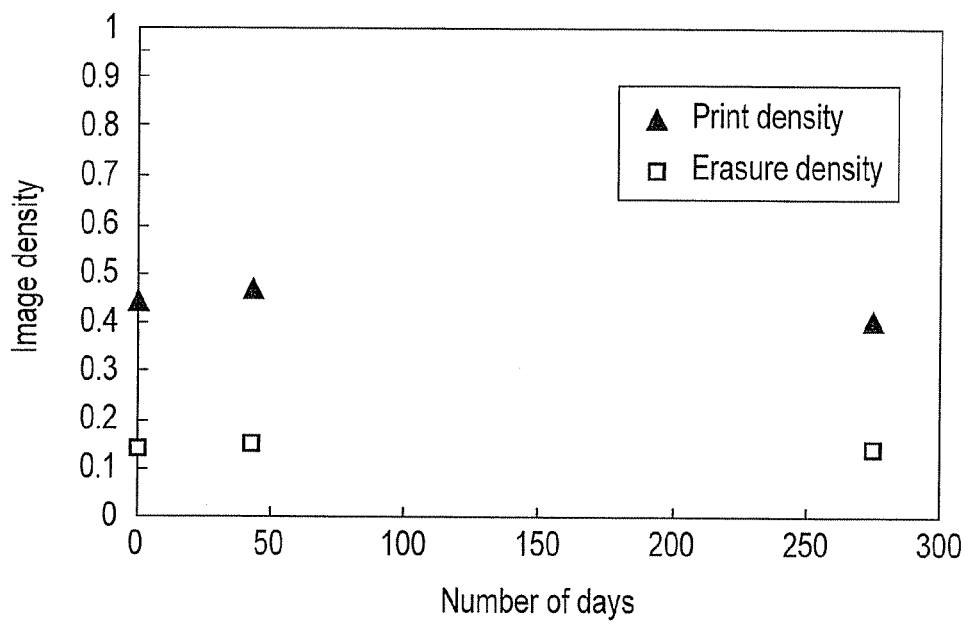
F I G. 2
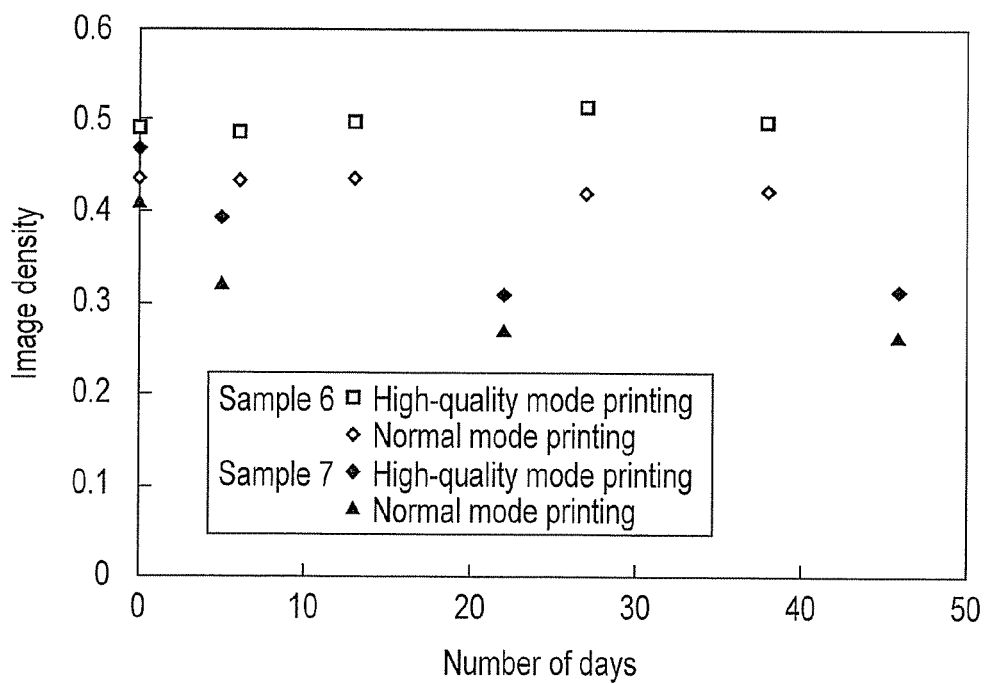
F I G. 3

ERASABLE INKJET INK

CROSS-REFERENCE TO RELATED APPLICATIONS

This application is based upon and claims the benefit of priority from prior Japanese Patent Application No. 2011-095308, filed on Apr. 21, 2011, the entire contents of which are incorporated herein by reference.

FIELD

Embodiments described herein relate generally to an erasable inkjet ink.

BACKGROUND

In general, an inkjet ink is an aqueous ink, and water-soluble materials are used. In recent years, an erasable inkjet ink including a leuco dye, a developer, and a solvent has been proposed. By using such an inkjet ink, a high density image can be formed on a paper, and the obtained image can be erased with heat. By heating the paper where the image has been formed, the image is erased and becomes invisible.

In addition to having the characteristics of an erasable ink, the erasable inkjet ink is also required to have the characteristics of an inject ink, such as the ejection performance from a printhead. All characteristics are required to be maintained without degradation with time. A combination of water and an alcohol may be used as the solvent of inkjet ink, and it needs to be prescribed appropriately so as to satisfy the above-mentioned characteristics.

BRIEF DESCRIPTION OF THE DRAWINGS

FIG. 2 is a graph showing the relationship between the number of days the ink has been stored and the density of the formed image; and FIG. 3 is a graph showing the relationship between the number of days the ink has been stored and the density of the formed image.

DETAILED DESCRIPTION

Figure 1:
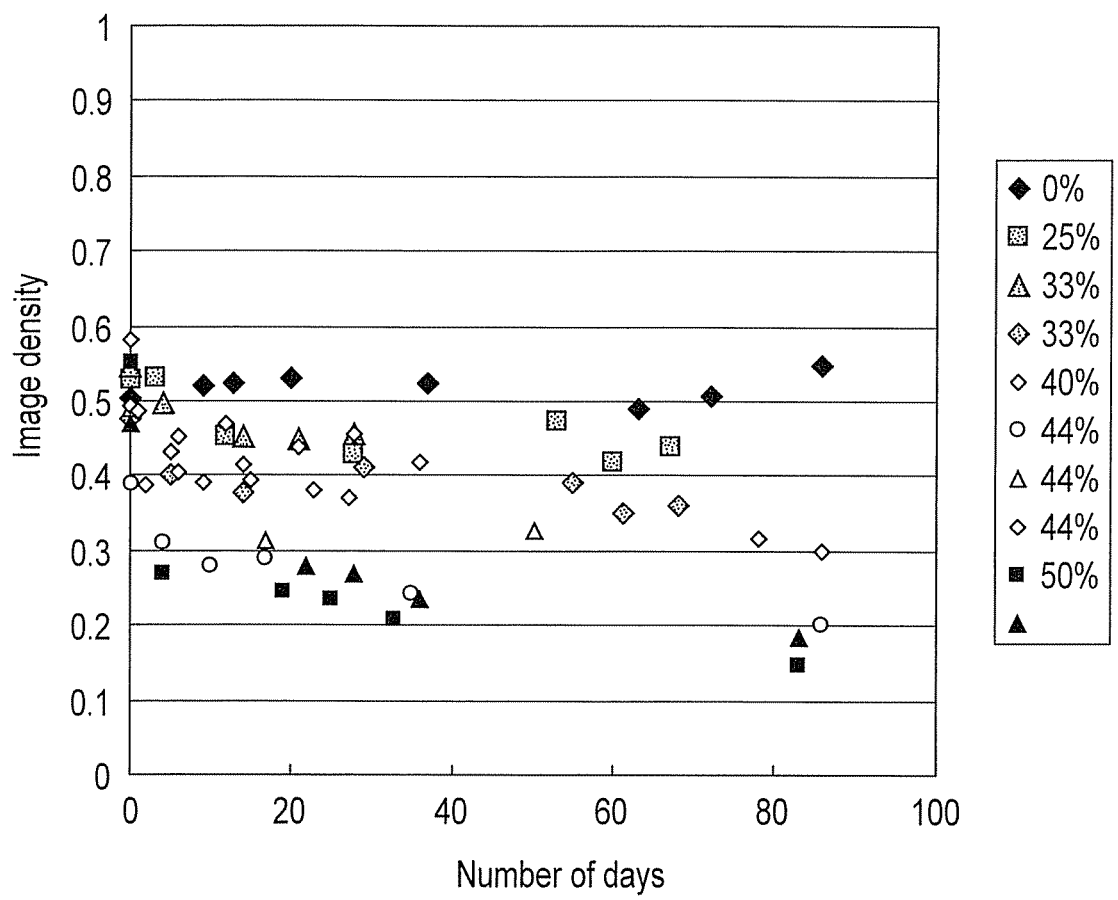
FIG. 1 is a graph showing the relationship between the number of days the ink has been stored and the density of the formed image.

In general, according to one embodiment, an erasable inkjet ink includes a leuco dye, a non-water-soluble developer, and a solvent containing alcohol and water. The amount of the water is 7 to 25% by mass of the solvent.

Hereinafter, embodiments will be specifically described.

In an erasable inkjet ink according to the present embodiment, the leuco dye and non-water-soluble developer are contained in the solvent.

The leuco dye includes, for example, electron-donating organic materials such as diarylphthalides, polyarylcarbinols, rhodamine B lactams, indolines, spiropyrans and fluorans.

Examples thereof include Crystal Violet Lactone (CVL), 2-anilino-6-(N-cyclohexyl-N-methylamino)-3-methylflouran, 2-anilino-3-methyl-6-(N-methyl-N-propylamino)flouran, 3-[4-(4-phenylaminophenyl)aminophenyl]amino-6-methyl-7-chlorofluoran, 2-anilino-6-(N-methyl-N-isobutylamino)-3-methylfluoran, 2-anilino-6-(dibutylamino)-3-methylfluoran, 3-chloro-6-(cyclohexylamino)fluoran, 2-chloro-6-(diethylamino) fluoran, 7-(N,N-dibenzylamino)-3-(N,N-diethylamino) fluoran, 3,6-bis(diethylamino)fluoran-γ-(4'-nitro)anilinolactam, 3-diethylaminobenzo[a]-fluoran, 3-diethylamino-6-methyl-7-aminofluoran, 3-diethylamino-7-xylidinofluoran, 3-(4-diethylamino-2-ethoxyphenyl)-3-(1-ethyl-2-methylindol-3-yl)-4-azaphtalide, 3-(4-diethylaminophenyl)-3-(1-ethyl-2-methylindol-3-yl)phthalide, 3-diethylamino-7-chroloanilinofluoran, 3-diethylamino-7,8-benzofluoran, 3,3-bis(1-n-butyl-2-methylindol-3-yl)phthalide, 3,6-dimethylethoxyfluoran, 3-diethylamino-6-methoxy-7-aminofluoran, diethylphosphoromethyl (DEPM), adenosine triphosphate (ATP), 2-(phenylamino)-3-methyl-6-[ethyl(p-tolyl)amino]spiro[9H-xanthene-9,1'(3'H)-isobenzofuran-3'-one (ETAC), 2-(2-chroloanilino)-6-dibutylaminofluoran, crystal violet carbinol, rhodamine B lactam, 2-(phenyliminoethanedilidene)-3,3-dimethylindoline, N-3,3-trimethylindolinobenzospiropyran, 8'-methoxy-N-3,3-trimethylindolinobenzospiropyran, 3-diethylamino-6-methyl-7-chrolofluoran, 3-diethylamino-7-methoxyfluoran, 3-diethylamino-6-benzyloxyfluoran, 1,2-dibenzo-6-diethylaminofluoran, 3,6-di-p-toluidino-4,5-dimethylfluoran, phenylhydrazide-γ-lactam, 3-amino-5-methylfluoran, and the like.

By selecting the leuco dye appropriately, various colors can be developed and can also be easily adopted in color applications. The particularly preferred materials are the leuco dyes based on the triphenylmethanes, the fluorans, and the phenylindolephthalides.

Alternatively, as the leuco dye, 7-[4-Diethylamino-2-(4-hydroxy)-phenyl]-7-(1-ethyl-2-methyl-1H-furo[3,4-b]pyridine-5-one (Blue C4OH), and furo[3,4-b]pyridin-5(7H)-one, 7-[4-(diethylamino)-2-hexyloxy]phenyl-7-(1-ethyl-2-methyl-1H-indol-3yl (Blue203) can also be used.

As a leuco dye, a single dye may be used alone, or two or more types of dyes may also be used in combination. When the amount of the leuco dye within the ink is about 0.3 to 1% by mass, the desired effects can be achieved without any problems.

In an erasable inkjet ink according to the present embodiment, a non-water-soluble developer is used. This is because the color developing mechanism is such that colors develop when the solvent evaporates and that the developer easily binds to the dye due to low solubility. In the present specification, those cases where the developer dissolves in 16° C. water to a maximum concentration of less than 0.4% by mass are referred to as non-water-soluble.

As a non-water-soluble developer, for example, phenols, benzophenones or the like can be used. Examples include, dihydroxybenzoic acids such as 2,3-dihydroxybenzoic acid and methyl 3,5-dihydroxybenzoate, and the esters thereof; hydroxyacetophenones such as 2,4-dihydroxyacetophenone, 2,5-dihydroxyacetophenone, 2,6-dihydroxyacetophenone, 3,5-dihydroxyacetophenone and 2,3,4-trihydroxyacetophenone; and hydroxybenzophenones such as 2,4-dihydroxybenzophenone (2,4-DHBP), 4,4'-dihydroxybenzophenone, 2,3,4-trihydroxybenzophenone, 2,4,4'-trihydroxybenzophenone, 2,2',4,4'-tetrahydroxybenzophenone and 2,3,4,4'-tetrahydroxybenzophenone. In addition, bisphenols are also excellent, and bisphenol F is particularly preferred.

For example, 2,4-dihydroxybenzophenone (2,4-DHBP) is not easy to dissolve in 16° C. water, and dissolves at most to a concentration of less than 0.38% by mass. In addition, bisphenol F dissolves in 16° C. water to a maximum concentration of less than 0.4% by mass.

It should be noted that ethyl gallate (EG) dissolves in 16° C. water to a maximum concentration of more than 1% by mass, and is therefore water-soluble.

A non-water-soluble developer may be used either singularly, or two or more types thereof in combination. As described later, in the erasable inkjet ink of the present embodiment, a combination of water and alcohol is used as a solvent, and the non-water-soluble developer is dissolved in alcohol. When alcohol evaporates, the non-water-soluble developer binds with the leuco dye to develop a color.

In order to ensure this color development, the mass of non-water-soluble developer contained in the inkjet ink of the present embodiment is preferably 10 times or more, and more preferably 15 times or more, than that of the leuco dye. The used amount of the non-water-soluble developer in terms of mass, which is contained in the inkjet ink of the present embodiment, is preferably kept to 30 times or less, and more preferably 25 times or less, the mass of the leuco dye.

The solvent in the inkjet ink of the present embodiment contains alcohol and water. In order to maintain the appropriate levels of color developing properties and erasability and to enhance the storage stability of the inkjet ink, while also ensuring the ejection performance from the printhead, the water amount in the erasable inkjet ink of the present embodiment is specified from 7 to 25% by mass of the solvent.

When the water amount is too small, the ejection performance appropriate as an inkjet ink cannot be achieved. On the other hand, when the water amount is too large, the storage stability of the ink reduces. This is a finding obtained by the present inventers.

Images were formed using the ink that has been stored for predetermined number of days, and the image density was examined immediately after printing. The storage condition is 10 to 35° C. In those cases where the ink does not contain water, the image density immediately after printing is 0.5 or more, even if the storage period was 80 days or more. The image density was also equivalent to this when an ink containing no water was used before storage.

In general, since the image density is required to be 0.4 or more, the requirement for the image density is met even after being stored for 80 days or more. As for ink that not contain water, it was confirmed that the storage stability was high. However, the ejection performance required for the inkjet ink cannot be secured by the ink that does not contain water.

In those cases where an ink that contains 50% by mass of water relative to the solvent was used before storage, the obtained image density was about 0.5. In those cases where this ink was used after 5 days of storage, the image density immediately after printing reduces to less than 0.3, and a high-density image cannot be obtained. When the storage period of this ink exceeded 80 days, the image density immediately after printing reduced further to less than 0.2.

After storage, the color development of the ink becomes insufficient and the obtained image density is low even immediately after printing. In the case of an ink with high water amount, the image density immediately after printing reduced further as the storage period extended. It was confirmed that an inkjet ink that contains 50% by mass of water relative to the solvent deteriorates considerably during storage.

In those cases where an ink that contained 44% by mass of water relative to the solvent was used before storage, the image density of close to 0.4 was obtained. In those cases where this ink was used after 5 days of storage, the image density immediately after printing reduced to about 0.3. When the storage period of this ink exceeded 80 days, the image density immediately after printing reduced further to about 0.2 to 0.3.

In those cases where an ink that contained 33% by mass of water relative to the solvent was used before storage, the image density of about 0.5 was obtained. In those cases where this ink was used after 20 days of storage, the image density immediately after printing reduced to about 0.45. When the storage period of this ink exceeded 60 days, the image density immediately after printing was about 0.35.

In those cases where an ink that contains 25% by mass of water relative to the solvent was used before storage, the image density above 0.5 was obtained, and when used after 5 days of storage, the image density did not reduce. When this ink was used after 60 days of storage, the image density immediately after printing was about 0.45, which was a practical level.

The above-mentioned results were put together and plotted on the graph in FIG. 1. The image density immediately after printing is required to be 0.4 or more, even if the storage period is 80 days or more. It is clear that this requirement is fulfilled if the amount of water is not more than 25% by mass of the solvent. Meanwhile, it was confirmed that if 7% by mass of water relative to the solvent was contained, appropriate ejection performance for the inkjet ink can be achieved. Based on this, the water amount in the erasable inkjet ink of the present embodiment is specified from 7 to 25% by mass of the solvent.

It was confirmed that the ink that contained 10% by mass of water relative to the solvent hardly deteriorated even when it was stored for a year or more. In the erasable inkjet ink of the present embodiment, the water amount is preferably 10 to 15% by mass relative to the solvent.

On the other hand, in the erasable inkjet ink of the present embodiment, the alcohol amount is preferably 70 to 90% by mass relative the solvent. If such an amount of alcohol is contained, the desired levels of ejection performance and color developing properties can be achieved without impairing the storage stability. The alcohol amount is more preferably 75 to 85% by mass of the solvent. Examples of alcohol include ethyl alcohol and propyl alcohol. Considering the safety and the smell, ethyl alcohol is preferable.

Propylene glycol monomethyl ether (PGMME) may be contained in the erasable inkjet ink in the present embodiment. PGMME has a function of enhancing the storage stability of ink. If necessary, additives such as a surfactant and an erasing agent may be added to the erasable inkjet ink of the present embodiment. The erasing agent has a function of accelerating discoloration.

The surfactant improves the solubility of the leuco dye and the developer. As a surfactant, any one of an anionic surfactant, a cationic surfactant and a non-ionic surfactant may be used.

Cationic surfactants include, for example, Sanisol 5B (manufactured by Kao Corporation: alkyl(C12-16) benzyldimethyl ammonium chloride CAS68424-85-1). Non-ionic surfactants include, for example, Emulgen (manufactured by Kao Corporation: A60 distyrenated phenyl ether).

As an erasing agent, for example, water-soluble resins such as polyvinylpyrrolidone and polyvinyl alcohol can be used. It is assumed that the resin component of the erasing agent encapsulates the leuco dye so as to separate the leuco dye from the non-water-soluble developer, thereby improving the erasability. If the amount of the erasing agent is too large, the color developing properties may deteriorate.

The color development of ink that contains the erasing agent deteriorates over time and eventually reaches a hardly visible level. The discoloration speed depends on the ink composition, and, in general, in inverse proportion to the amount of the non-water-soluble developer. For this reason, when the amount of non-water-soluble developer is too small, the color development is maintained for several hours to about 24 hours. Therefore, images formed by such an ink will be naturally erased within 24 hours. On the other hand, when the leuco dye is selected with an adequate amount of developer combined, the ink which maintains the color development for at least several weeks, to, in some cases, one month or more, can be obtained.

As described above, because the color of the ink that contains the erasing agent fades naturally, the recycling of paper is possible without providing the energy for erasing the images. Heating may be conducted in order to erase the images promptly.

In addition, polyhydric alcohols such as glycerin may be added to the erasable inkjet ink of the present embodiment as a drying prevention agent for the head of an inkjet device. It is desired that the amount of the drying prevention agent be selected appropriately in accordance with the desired viscosity.

In order to obtain the erasable inkjet ink of the present embodiment, the leuco dye and the non-water-soluble developer are dissolved in an alcohol to prepare a color material solution. In some cases, glycerin or PGMME serving as a viscosity modifier may be added to the alcohol. A predetermined amount of water is added thereto dropwise. The amount of water is specified so as to achieve 7 to 25% by mass of the obtained solvent.

By uniformly stirring the color material solution where the water has been added, the erasable inkjet ink of the present embodiment is obtained. The erasable inkjet ink of the present embodiment exhibits an excellent ejection performance from the printhead, and the color development on paper is also excellent. The color development of ink of the present embodiment deteriorates by heating and becomes substantially invisible. Moreover, the ink of the present embodiment does not degrade over time, and even if it is used after storage, the image density of about the same level as the one before storage can be obtained.

Specific examples of the erasable inkjet ink are listed below.

<Ink Sample 1>

Crystal Violet Lactone CVL (manufactured by Yamada Kagaku Co., Ltd.) was used as the leuco dye, and bisphenol F was used as the developer. 18 g of ethanol was placed in a 20-cc sample tube, and 0.1 g of the leuco dye and 1.2 g of the developer were added. The resultant was dissolved uniformly by using a magnetic stirrer under a room temperature condition to obtain a color material solution.

A surfactant was dissolved in water to prepare a 5% by mass surfactant solution. Emulgen (manufactured by Kao Corporation: A60 distyrenated phenyl ether) was used as a surfactant. 2 g of the surfactant solution was added dropwise to the aforementioned color material solution and stirred for 5 minutes using a magnetic stirrer. The mixture obtained after stirring was filtered through a 1-μm filter paper to obtain an ink sample 1. In the ink sample 1, the solvent is composed of ethanol and water, and the amount of water is 10% by mass of the solvent.

The ink sample 1 was placed in a commercially available ink cartridge and installed in a commercially available inkjet printer. By using this inkjet printer, a character and a solid image were formed on a paper with self-made test chart to obtain a printed sample. Plain paper was used as a paper. The reflectance was measured for a 1-cm-square area of the solid image, and the image density was calculated from the obtained reflectance. A colorimeter (CR300 manufactured by Konica Minolta Holdings, Inc.) was used to measure the reflectance. The image density when printed in normal mode was 0.55, and the image density when printed in high-quality mode was 0.65.

The images on each printed samples were erased by heat, and the density of the paper after the erasure was examined. To erase the image, the image-erasing device for e-blue manufactured by Toshiba Corporation (HE-1) was used. Using the aforementioned device, heating was conducted at about 130° C. for 2 hours followed by 1 hour of cooling.

The image densities after erasure (erasure density) were 0.09 and 0.092 respectively. In both cases, the solid image and the character were at a completely invisible level. The density of the paper itself that was used here is 0.088. Because the density of 0.1 or less is almost white, with the results obtained here, the erasability can be judged as excellent, and therefore, the ink sample 1 bears adequate erasability.

<Ink Sample 2>

CVL (manufactured by Yamada Kagaku Co., Ltd.) was used as the leuco dye, and bisphenol F was used as the developer. 8 g of ethanol was placed in a 20-cc sample tube, and 0.05 g of the leuco dye and 0.8 g of the developer were added. The resultant was dissolved uniformly in the same manner as described above to obtain a color material solution.

A surfactant was dissolved in water to prepare a 5% by mass surfactant solution. Sanisol 5B (manufactured by Kao Corporation: alkyl(C12-16) benzyldimethyl ammonium chloride CAS68424-85-1) was used as the surfactant. 2 g of the surfactant solution was added dropwise to the aforementioned color material solution and then stirred for 5 minutes in the same manner as described above. The mixture obtained after stirring was filtered through a 1-μm filter paper to obtain an ink sample 2. In the ink sample 2, the solvent is composed of ethanol and water, and the amount of water is 20% by mass of the solvent.

The ink sample 2 was placed in a commercially available ink cartridge and installed in the same inkjet printer as described above. Printed samples were obtained by forming a character and a solid image on the same type of paper as described above, and the image density was examined. The image density when printed in normal mode was 0.55, and the image density when printed in high-quality mode was 0.62.

The image on the printed samples was erased by heat in the same manner as described above and the erasure density was examined. The erasure densities were 0.096 and 0.112, respectively. In both cases, the solid image remained to an extent that could be confirmed visually, but the character was at a completely invisible level. The density of the paper itself that was used here was 0.088, and therefore, the ink sample 2 bears adequate erasability.

The printed samples were stored in a container with 28 to 33° C. and an RH of 46 to 78%. The image density after 24 hours was 98% relative to that before storage. Since the images formed with the ink sample 2 had high storage stability, it was confirmed that the ink sample 2 also had the basic characteristics as an ink.

<Ink Sample 3>

CVL (manufactured by Yamada Kagaku Co., Ltd.) was used as the leuco dye, and 2,4-dihydroxybenzopheonone 2,4-DHBP (brand name: Zislizer, manufactured by Sankyo Kasei Co., Ltd.), and p-hydroxybenzophenone (manufactured by Tokyo Chemical Industry Co., Ltd.) were used as the developers. 8 g of ethanol and 1 g of glycerin were placed in a 20-cc sample tube, and 0.05 g of the leuco dye and 0.5 g of each of the developers were added. The resultant was dissolved uniformly in the same manner as described above to obtain a color material solution.

A surfactant was dissolved in water to prepare a 5% by mass surfactant solution. Sanisol 5B (manufactured by Kao Corporation: alkyl(C12-16) benzyldimethyl ammonium chloride CAS68424-85-1) was used as the surfactant. 1 g of the surfactant solution was added dropwise to the aforementioned color material solution and then stirred for 5 minutes in the same manner as described above. The mixture obtained after stirring was filtered through a 1-μm filter paper to obtain an ink sample 3. In the ink sample 3, the solvent is composed of ethanol, water and glycerin, and the amount of water is 10% by mass of the solvent.

The ink sample 3 was placed in a commercially available ink cartridge and installed in the same inkjet printer as described above. Printed samples were obtained by forming a character and a solid image on the same type of paper as described above, and the image density was examined. The image density when printed in normal mode was 0.45, and the image density when printed in high-quality mode was 0.55.

The printed samples were stored in a container with 24° C. and an RH of 68%. The image density after 24 hours reduced to 64 to 70% relative to that before storage. The images formed with the ink sample 3 is affected by humidity and erased naturally. Since the image will be erased by leaving the paper on which the image was formed standing for a prolonged period of time, in those cases where the ink sample 3 was used, an erasing device is not needed unless quick erasure is required.

<Ink Samples 4-7>

BlueC4OH (manufactured by Yamada Kagaku Co., Ltd.: 7-[4-Diethylamino-2-(4-hydroxy)-phenyl]-7-(1-ethyl-2-methyl-1H-furo[3,4-b]pyridine-5-one) was used as the leuco dye and ethyl 2,4-dihydroxybenzoate was used as the developer.

0.05 g ($9.5 \times 10^{-5}$ mol) of the leuco dye and 1.0 g ($5.48 \times 10^{-4}$ mol) of the developer were placed in a 20-cc sample tube, and 2 g of PGMME and 2 g of ethanol were added. The sample tube was shielded from light with aluminum foil, and the content was stirred uniformly for 10 minutes using a magnetic stirrer to obtain a color material solution.

A surfactant was dissolved in water to prepare a 5% by mass surfactant solution. Sanisol 5B (manufactured by Kao Corporation: alkyl(C12-16) benzyldimethyl ammonium chloride CAS68424-85-1) was used as the surfactant. 4 g of the surfactant solution was slowly added dropwise to the aforementioned color material solution. The resultant was stirred for 30 minutes at room temperature, and then filtered through a 1-μm filter paper to obtain an ink sample 4. In the ink sample 4, the solvent is composed of ethanol, PGMME and water, and the amount of water is 44% by mass of the solvent.

The ink sample 4 was placed in a commercially available ink cartridge and installed in the same inkjet printer as described above. Printed samples were obtained by forming a character and a solid image on the same type of paper as described above, and the image density was examined. The printed samples were heated at the maximum temperature of an iron (200° C. or more) to erase the images. The image density after the erasure was calculated for the same portion as the image density of the color development. The image density was about 0.42, and the erasure density was about 0.11.

The ink sample 4 was stored in a container while being installed in an ink cartridge. Using the ink after predetermined number of days, the image was formed in the same manner as described above and the image density was examined. Furthermore, the image was erased in the same manner as described above, and the image density after the erasure was calculated. The results were summarized in the graph in FIG. 2.

As shown in FIG. 2, the print density and the erasure density of the ink sample 4 after 270 or more days of storage, were about the same as in the cases where the ink before storage was used. Meanwhile, the density of the paper itself that was used here was 0.118, and therefore, the ink sample 4 bears adequate erasability.

Using a sample (ink sample 5) that has been prepared in the same manner as the ink sample 4 except for the lack of PGMME addition, the image was formed and erased. The conditions for the formation and the erasure of the image were the same as those described above. The erasability was 0.13 to 0.14 and is lower than that of the ink samples 1 to 3 which used the CVL. Although the erasability of the ink containing Blue C40H is low, the erasability can be enhanced by combining PGMME, as in the ink sample 4.

Furthermore, an ink sample 6 was prepared in the same manner as the ink sample 4 with the exception that the water amount was changed to 50% by mass of the ink solvent. Also, an ink sample 7 was prepared in the same manner as the ink sample 5 with the exception that the water amount was changed to 50% by mass of the solvent.

Using the ink sample 6 and the ink sample 7, the images were formed in the same manner as described above, and the image densities were examined. Thereafter, each ink samples was stored in a container while being installed in the ink cartridges. Using the ink after predetermined number of days, the image was formed in the same manner as described above, and the image density was examined. Two types of images were formed by "normal-mode printing" and by "high-quality-mode printing". The results examined for the ink sample 6 and the ink sample 7 were plotted on the graph in FIG. 3.

In those cases where the ink sample 7 containing no PGMME was stored for 20 or more days, the density of the formed image was around 0.3. The ink sample 6 containing PGMME can form the image with the density at the same level as that before storage, even after being stored for nearly 40 days. It is clear that the storage stability of ink increased due to the inclusion of PGMME.

<Ink Sample 8>

CVL (manufactured by Yamada Kagaku Co., Ltd.) was used as the leuco dye, and bisphenol F was used as the developer. 6 g of ethanol, 2 g of PCMMA and 1 g of glycerin were placed in a 20-cc sample tube, and 0.05 g of the leuco dye and 0.1 g of the developer were added. The resultant was dissolved uniformly in the same manner as described above to obtain a color material solution.

A surfactant was dissolved in water to prepare a 2.5% by mass surfactant solution. Emulgen (manufactured by Kao Corporation: A60 distyrenated phenyl ether) was used as a surfactant. 2 g of the surfactant solution was added dropwise to the aforementioned color material solution and then stirred for 5 minutes in the same manner as described above. The mixture obtained after stirring was filtered through a 1-μm filter paper to obtain an ink sample 8. In the ink sample 8, the solvent is composed of ethanol and water, and the amount of water is 18% by mass of the solvent.

The ink sample 8 was placed in a commercially available ink cartridge and installed in the same inkjet printer as described above. Printed samples were obtained by forming a character and a solid image on the same type of paper as described above, and the image density was examined. The image density when printed in normal mode was 0.57, and the image density when printed in high-quality mode was 0.66.

The image of the printed samples was erased by heat in the same manner as described above and the erasure density was examined. The erasure densities were 0.094 and 0.101, respectively. In both cases, the characters and the solid images were at completely invisible levels. The density of the paper itself that was used here was 0.088, and therefore, the ink sample 8 bears adequate erasability.

Next, an image was formed in the same manner as described above with the exception that a moisture-absorbed paper was used. The paper was stored within a sealed container which contained water to absorb moisture. Even when the moisture-absorbed paper was used, 96% of image density relative to that of the dry paper was obtained. It is clear that the ink sample 8 exhibits a highly consistent performance even under high humidity conditions.

The erasable inkjet ink of the embodiment can form an image of high density and can also be erased to a fully invisible state.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An erasable inkjet ink comprising:
    a leuco dye;
    a non-water-soluble developer; and
    a solvent comprising an alcohol and water, an amount of the water being 7 to 25% by mass of the solvent.

2. The ink according to claim 1, wherein the alcohol is ethyl alcohol.

3. The ink according to claim 1, wherein the amount of the water is 10 to 15% by mass of the solvent.

4. The ink according to claim 1, wherein an amount of the alcohol is 70 to 90% by mass of the solvent.

5. The ink according to claim 4, wherein the amount of the alcohol is 75 to 85% by mass of the solvent.

6. The ink according to claim 1, wherein a mass of the non-water-soluble developer is 10 to 30 times as large as a mass of the leuco dye.

7. The ink according to claim 6, wherein the mass of the non-water-soluble developer is 15 to 25 times as large as the mass of the leuco dye.

8. The ink according to claim 1, further comprising propylene glycol monomethyl ether.

9. The ink according to claim 1, further comprising a surfactant.

10. The ink according to claim 1, further comprising a viscosity modifier.

11. A method of producing the erasable inkjet ink according to claim 1, the method comprising:
    dissolving a leuco dye and a non-water-soluble developer in an alcohol to obtain a color material solution by; and
    adding water to the color material solution, the water amounting to 7 to 25% by mass of a solvent of the erasable inkjet ink, the solvent comprising the alcohol and water.

12. The method according to claim 11, wherein the alcohol is ethyl alcohol.

13. The method according to claim 11, wherein the water is added to the color material solution so as to amount to 10 to 15% by mass of the solvent.

14. The method according to claim 11, wherein the alcohol is used so as to amount to 70 to 90% by mass of the solvent.

15. The method according to claim 11, wherein the alcohol is used so as to amount to 75 to 85% by mass of the solvent.

16. The method according to claim 11, wherein the non-water-soluble developer is used at a mass of 10 to 30 times as large as a mass of the leuco dye.

17. The method according to claim 16, wherein the non-water-soluble developer is used at a mass of 15 to 25 times as large as a mass of the leuco dye.

* * * * *